(12) United States Patent
Alhamzani et al.

(10) Patent No.: US 12,447,462 B2
(45) Date of Patent: Oct. 21, 2025

(54) METHOD OF MAKING NANOCOMPOSITE FROM DATE PALM TREE AND SAUDI BENTONITE

(71) Applicant: IMAM MUHAMMAD IBN SAUD ISLAMIC UNIVERSITY, Riyadh (SA)

(72) Inventors: Abdulrahman G. Alhamzani, Riyadh (SA); Saad A. Aljlil, Riyadh (SA)

(73) Assignee: IMAM MUHAMMAD IBN SAUD ISLAMIC UNIVERSITY, Riyadh (SA)

( * ) Notice: Subject to any disclaimer, the term of this patent is extended or adjusted under 35 U.S.C. 154(b) by 444 days.

(21) Appl. No.: 18/165,366

(22) Filed: Feb. 7, 2023

(65) Prior Publication Data

US 2024/0261760 A1 Aug. 8, 2024

(51) Int. Cl.
*B01J 20/24* (2006.01)
*B01J 20/16* (2006.01)
(Continued)

(52) U.S. Cl.
CPC .......... *B01J 20/24* (2013.01); *B01J 20/165* (2013.01); *B01J 20/28007* (2013.01); *B01J 20/28011* (2013.01); *B01J 20/28026* (2013.01); *B01J 20/3021* (2013.01); *B01J 20/3071* (2013.01); *B01J 20/3078* (2013.01); *B01J 20/3085* (2013.01); *C02F 1/288* (2013.01);
(Continued)

(58) Field of Classification Search
None
See application file for complete search history.

(56) References Cited

U.S. PATENT DOCUMENTS 10,259,725 B2 4/2019 Alkendi et al.

FOREIGN PATENT DOCUMENTS

BR 112019010802 * 10/2019 .............. D21H 23/04
CN 100591627 C 2/2010
(Continued)

OTHER PUBLICATIONS

Wu, et al., Synthesis and characterisation of hydrophobic modified polyacrylamide, Polym Int 53:1821-1830 (2004) DOI: 10.1002/pi.1589 (Year: 2004).*

(Continued)

*Primary Examiner* — Chester T Barry
(74) *Attorney, Agent, or Firm* — Oblon, McClelland, Maier & Neustadt, L.L.P.

(57) ABSTRACT

A method of making a nanocomposite is provided. The method includes dispersing nanocellulose and nano-bentonite in water and mixing to form a mixture. The method includes drying by heating the mixture at a temperature of at least 40° C. to form a dry mixture. The method further includes mixing the dry mixture with an alkylamine to form a nanocomposite composition. The method includes heating the nanocomposite composition at a temperature of at least 100° C. to form a paste. The method includes drying and milling the paste to form the nanocomposite. The nanocellulose is prepared from date-palm tree leaflets. The nanobentonite is prepared from Saudi Arabia bentonite clay from the Khulays Mine. A method of treating water with the nanocomposite prepared by the method of the present disclosure is also provided.

20 Claims, 8 Drawing Sheets

(51) Int. Cl.
  *B01J 20/28* (2006.01)
  *B01J 20/30* (2006.01)
  *C02F 1/28* (2023.01)
  *C08B 15/00* (2006.01)
  *C02F 101/20* (2006.01)
  *C02F 101/30* (2006.01)

(52) U.S. Cl.
  CPC ........... *C08B 15/00* (2013.01); *B01J 2220/46* (2013.01); *B01J 2220/4806* (2013.01); *B01J 2220/485* (2013.01); *C02F 1/281* (2013.01); *C02F 1/286* (2013.01); *C02F 2101/20* (2013.01); *C02F 2101/308* (2013.01); *C02F 2305/08* (2013.01)

(56) References Cited

FOREIGN PATENT DOCUMENTS

| CN | 109078621 A |   | 12/2018 |          |
|----|-------------|---|---------|----------|
| CN | 109159243 A | * | 1/2019  | B27N 3/12 |
| CN | 109277087 A |   | 1/2019  |          |
| CN | 110479226 A |   | 11/2019 |          |

OTHER PUBLICATIONS

Machine translation of CN109159243A (Year: 2025).*
Isogai, Development of completely dispersed cellulose nanofibers, Proc. Jap. Acad. Ser. B, 2018, vol. 94, Iss 4, p. 161-179, released online J-STAGE Apr. 11, 2018, https://www.jstage.jst.go.jp/article/pjab/94/4/94_PJA9404B-01/_article/-char/en (Year: 2018).*
Machine Translation of BR112019010802 (Year: 2025).*
Machine Translation of CN109159243 (Year: 2025).*
N. Narayanan, et al., "Decontamination of pesticide industrial effluent by adsorption-coagulation-flocculation process using biopolymer-nanoorganoclay composite", International Journal of Environmental Science and Technology, vol. 17, No. 12, Jun. 5, 2020, pp. 4775-4786 (Abstract only).
Sourbh Thakur, at al., "Cellulosic biomass-based sustainable hydrogels for wastewater remediation: Chemistry and prospective", Fuel, vol. 309, Article No. 122114, Feb. 1, 2022, 4 pages (Abstract only).
Anissa Leshaf, et al.; "Adsorption of Acidol Red 2BE-NW Dye from Aqueous Solutions on Carboxymethyl Cellulose/Organo-Bentonite Composite: Characterization, Kinetic and Thermodynamic Studies", Journal of Polymers and the Environment, vol. 27, No. 2, Feb. 27, 2019, pp. 1054-1064.
Shella Permatasari Santoso, et al., "Eco-friendly cellulose-bentonite porous composite hydrogels for adsorptive removal of azo dye and soilless culture", Cellulose, vol. 26, 2019, pp. 3339-3358.
Sanna Hokkanen, et al., "Removal of $Cd^{2+}$, $Ni^{2+}$ and $PO_4^{3-}$ from aqueous solution by hydroxyapatite-bentonite clay-nanocellulose composite", International Journal of Biological Macromolecules, 2018, pp. 1-33.
Fathin Najihah Nor Mohd Hussin, et al., "Nanocellulose and nanoclay as reinforcement materials in polymer composites: A review", Malaysian Journal of Fundamental and Applied Sciences (MJFAS), vol. 16, No. 2, 2020, pp. 145-153.
Xiaoyin Sun, et al., "Fabrication of Polyethyleneimine-Modified Nanocellulose/Magnetic Bentonite Composite as a Functional Biosorbent for Efficient Removal of Cu(II)", Water, vol. 14, No. 2656, Aug. 28, 2022, pp. 1-19.
T.S. Anirudhan, et al., "Nanocellulose/nanobentonite composite anchored with multi-carboxyl functional groups as an adsorbent for the effective removal of Cobalt(II) from nuclear industry wastewater samples", Journal of Colloid and Interface Science, vol. 467, 2016, pp. 307-320.
T. S. Anirudhan, et al., "Synthesis and characterization of multi-carboxyl-functionalized nanocellulose/nanobentonite composite for the adsorption of uranium(VI) from aqueous solutions: Kinetic and equilibrium profiles", Chemical Engineering Journal, vol. 273, 2015, 42 pages.

* cited by examiner

METHOD OF MAKING NANOCOMPOSITE FROM DATE PALM TREE AND SAUDI BENTONITE

STATEMENT OF ACKNOWLEDGEMENT

This research was supported by the Deputyship for Research and Innovation, Ministry of Education in Saudi Arabia under the project number IFP-IMSIU20201, and the Deanship of Innovation and Entrepreneurship at Imam Mohammad Ibn Saud Islamic University.

BACKGROUND

Technical Field

The present disclosure is directed to a method of making a nanocomposite material, and particularly, to a method of preparing a nanocomposite of nanocellulose from date palm tree leaflets and nano-bentonite from Saudi bentonite.

Description of Related Art

The "background" description provided herein is to generally present the context of the disclosure. Work of the presently named inventors, to the extent it is described in this background section, as well as aspects of the description which may not otherwise qualify as prior art at the time of filing, are neither expressly nor impliedly admitted as prior art against the present invention.

Global water demand is increasing due to population increase, urbanisation, and changes in weather patterns [The United Nations. World Water Development Report 2105, Water for a Sustainable World. 2015]. Water contamination has also grown to be one of the most critical global issues [Henze, M. Biological Wastewater Treatment: Principles, Modelling and Design; IWA Publishing: London, U K, 2008]. The application of biopolymers has been proposed as a potential influential tool for the elimination of heavy metals since no solid waste will be produced after adsorption, and the adsorbents are biodegradable and recyclable. The polymer and film structure may also impact its production process [Lalia, B. S.; Kochkodan, V.; Hashaikeh, R.; Hilal, N. A review on membrane fabrication: Structure, properties and performance relationship. Desalination 2013, 326, 77-95]. Additionally, electrospinning may be used to produce nanofiber film with high sorption capacities and high surface area to volume ratio. Therefore, the produced films may be used to filter pollutants out of natural sources [Callegari, G.; Tyomkin, I.; Kornev, K. G.; Neimark, A. V.; Hsieh, Y.-L. Absorption and transport properties of ultra-fine cellulose webs. J. Colloid Interface Sci. 2011, 353, 290-293]. Moreover, compared to conventional barrier layer techniques, adsorptive nanofiber film may provide greater porosities and linked pore architectures that permit higher efficiency [Saeed, K.; Haider, S.; Oh, T.-J.; Park, S.-Y. Preparation of amidoxime-modified polyacrylonitrile (PAN-oxime) nanofibers and their applications to metal ions adsorption. J. Membr. Sci. 2008, 322, 400-405].

Due to global concerns regarding climate change and shortages of oil resources, date palm (*Phoenix dactylifera* L.) by-products (leaflets, pods, stems, and fruit bunch) can be considered a valuable biomass resource. Cellulose is regarded as one of the bio-based solutions for sustainable resources and can be extracted from a variety of natural sources including rice straw, cotton, leaves, wood, seeds, shells and peels [M. Dakiky, M. Khamis, A. Manassra, M. Mer'eb, Selective adsorption of chromium (VI) in industrial wastewater using low-cost abundantly available adsorbents, Adv. Environ. Res. 6 (2002) 533-540; Sulyman, M., Namiesnik, J., Gierak, A., 2017. Low-cost adsorbents derived from agricultural by-products/wastes for enhancing contaminant uptakes from wastewater: a review. Polish J. Environ. Stud. 26 (3); Bethke, K., Palantöken, S., Andrei, V., Roß, M., Raghuwanshi, V. S., Kettemann, F., Greis, K., Ingber, T. T., Stückrath, J. B., Valiyaveettil, S., 2018. Functionalized cellulose for water purification, antimicrobial applications, and sensors. Adv. Funct. Mater. 28 (23), 1800409]. As a major component of plant fibers, cellulose is a natural hydrophilic polymer, which includes linear chains of 1,4-linked β-D-anhydroglucose units [R. C. Pettersen, "The Chemistry of Solid Wood", 1984, pp. 57-126]. The cellulose backbone is abundant in functional groups making it easy to be chemically modified to create new materials. In recent years, focus is made on converting cellulose into value-added renewable materials [Irmak, in "Biomass Volume Estimation and Valorization for Energy", Jaya Shankar Tumuluru, InTech, 2017, pp. 201-225; A. Gallegos, Z. Ahmed, M. Asgher, R. Parra-Saldivar, and H. M. N. Iqbal, Int. J. Biol. Macromol., 99, 308 (2017); T. W. Ching, V. Haritos and A. Tanksale, Carbohyd. Polym., 157, 1794 (2017)]. Preparation of cellulose nanofibers and nanocrystals are explored due to corresponding unique properties and mechanical performance in advanced applications [H. Yano, Nippon Gomu Kyokaishi, 12, 376 (2012); H. P. S. Abdul Khalil, Y. Davoudpour, Md. Islam, A. Mustapha, K. Sudrsh et al., Carbohyd. Polym., 99, 649 (2014); A. Chakrabarty and Y. Teramoto, Polymers, 10, 517 (2018); N. Mittal, F. Ansari, K. Gowda. V. C. Brouzet, P. Chen et al., ACS Nano, 12, 6378 (2018); R. Li, K. Zhang and G. Chen, Materials, 12, 322 (2019)]. Biomedical devices, sensors, gas separation membranes, and food packaging are a few possible applications [R. Weishaupt, G. Siqueira, M. Schubert, M. M. Kampf, T. Zimmermann et al., Adv. Funct. Mater., 27, 4 (2017); D. Klemn, F. Kramer, S. Moritz, T. Lindström, M. Ankerfors et al., Angew. Chem. Int. Ed., 50, 5438 (2011); A. Isogai, J. Wood Sci., 59, 449 (2013)]. Cellulose nanofibers have been extracted from different biomasses. Flax straws [E. Kopania, J. Wietecha and D. Ciechańska, Fibres Text. East. Eur., 96, 167 (2012)], rice husk [D. Battegazzore, S. Bocchini, J. Alongi, A. Frache and F. Marino, Cellulose, 21, 1813 (2014)], argan press cake waste [Y. Hu, O. Hamed, R. Salghi, N. Abidi, S. Jodeh, et al., Cellulose Chem. Technol., 51, 263 (2017)], *Citrullus colocynthis* seeds [I. Kouadri and H. Satha, Ind. Crop. Prod., 124, 787 (2018)], and oil palm tree parts [Y. Okahisaa, Y. Furukawa, K. Ishimoto, C. Narita, K. Intharapichal et al., Carbohyd. Polym., 198, 313 (2018)] are promising as raw materials.

Date palm tree is rich in cellulose, the fiber from which can be obtained from parts of the tree, such as mesh, spadix stems, midribs, and leaflets. Cellulose nanofibers obtained from different parts of the date palm tree have different characteristics in terms of structure, morphology, degree of polymerization, and surface properties [A. Isogai, J. Wood Sci., 59, 449 (2013)]. Various methods have been reported for extracting cellulose from agricultural biomass resources and turning the same into nanocellulose. Methods for nanocellulose production involve acidic hydrolysis using sulfuric acids and hydrochloric acids. The process is based on the hydrolysis of amorphous (semicrystalline) or accessible cellulose [D. Trache, M. H. Hussin, M. K. M. Haafiz and V. K. Thakur, Nanoscale, 9, 1763 (2017)].

Nanocellulose may be obtained from empty fruit bunches under acidic conditions with 64% sulfuric acid and vigorous agitation at 45° C., affording a blended nanomaterial with poly(vinyl alcohol)/starch [N. S. Lani, N. Ngadi, A. Johari and M. Jusoh, J. Nanomater., 3, 1 (2014)]. Cellulose nanocrystals may be extracted from palm leaf sheaths, generated as a by-product after harvesting, through chlorine-free refining methods, followed by hydrolysis under acidic conditions [E. Hafemann, R. Battisti, C. Marangoni, and R. Machado, Carbohyd. Polym., 218, 188 (2019)]. Recently, methods for obtaining nanocellulose are developed, such as oxidation [J. Peyre, T. Pääkkönen, M. Reza and E. Kontturi, Green Chem., 17, 808 (2015)], esterification [L. Chen, J. Y. Zhu, C. Baez, P. Kitin and T. Elder, Green Chem., 18, 3835 (2016)], ionic liquids [H. Abushammala, I. Krossing, and M. P. Laborie, Carbohyd. Polym., 134, 609 (2015)], microwave-assisted, hydrothermal treatment, subcritical water [A. S. Matharu, E. M. de Melo, J. Remón, S. Wang, A. Abdulina, et al., ChemSusChem., 11, 1344 (2018)], and electron beam irradiation.

Although methods for preparing nanocellulose have been developed, there still exists a need for alternative ways to reduce the efforts and costs of disposal of by-product wastes by turning such wastes into valuable products [Alhamzani, A G, Habib, M A. Cellulose Chem. Technol., 2021, 55 (1-2), 33-39]. Cellulose is an effective material for the adsorption of heavy metals, such as cellulose acetate membranes for water desalination in the field of water filtration. However, pure cellulose has a low capacity, stability, limited adsorption sites for adsorption and is prone to bacterial development [Okieimen, F., Sogbaike, C., Ebhoaye, J., 2005. Removal of cadmium and copper ions from aqueous solution with cellulose graft copolymers. Separation Purification Tech. 44 (1), 85-89]. Various functionalization techniques have been developed to enhance the surface stability of cellulose, such as functionalizing cellulose with organic and/or inorganic elements to enhance the adsorption capacity of the cellulosic materials in the remediation systems [Zhang, C., Su, J., Zhu, H., Xiong, J., Liu, X., Li, D., Chen, Y., Li, Y., 2017. The removal of heavy metal ions from aqueous solutions by amine functionalized cellulose pretreated with microwave-$H_2O_2$. RSC Adv. 7 (54), 34182-34191]. Chemically modified cellulose-bentonite composite is fabricated by polymerization technique [Shella Permatasari Santoso, Alfin Kurniawan, Felycia Edi Soetaredjo, Kuan-Chen Cheng, Jindrayani Nyoo Putro, Suryadi Ismadji, Yi-Hsu Ju, Cellulose (2019) 26:3339-3358]. However, method of fabricating cellulose from low-cost readily available natural materials at nanoscale is yet to be disclosed. On the other hand, the technology of applying cellulose nanofibers and cellulose nanocrystals for absorbing and removing contaminants (e.g., heavy metals and organic dyes) from industrial waste (e.g., wastewater) is of great economical value.

Accordingly, an object of the present disclosure is to describe a method of making a nanocomposite from nanocellulose and nano-bentonite. A further object of the present disclosure is to describe a method of preparing the nanocellulose from a cellulose-rich biomass (nanocellulose) by-product of *Phoenix dactylifera* L., namely, leaflets. A third object of the present disclosure is to provide a method of preparing the nano-bentonite from bentonite clay.

SUMMARY

In an exemplary embodiment, a method of making a nanocomposite is described. The method includes dispersing nanocellulose and nano-bentonite in water and mixing to form a mixture. The method includes drying by heating the mixture at a temperature of at least 40° C. to form a dry mixture. The method further includes mixing the dry mixture with an alkylamine to form a nanocomposite composition. The method further includes heating the nanocomposite composition at a temperature of at least 100° C. to form a paste. The method further includes drying and milling the paste to form the nanocomposite.

In some embodiments, the nanocellulose is prepared from date-palm tree leaflets. In some embodiments, the nano-bentonite is prepared from Saudi Arabia bentonite clay.

In some embodiments, the nanocellulose has a width ranging from 5 to 100 nanometers (nm).

In some embodiments, the nanocellulose has peaks at 500 to 650 inverse centimeter (cm 1), 1000 to 1100 $cm^{-1}$ and 2800 to 3400 $cm^{-1}$ in a Fourier transform infrared (FT-IR) spectrum.

In some embodiments, the nano-bentonite has a particle size in a range of 5 to 100 nm.

In some embodiments, the nano-bentonite has peaks at 850 to 1050 $cm^{-1}$ and 3400 to 3700 $cm^{-1}$ in the FT-IR spectrum.

In some embodiments, the nanocellulose and nano-bentonite are uniformly distributed throughout the nanocomposite. In some embodiments, the nanocomposite has a thickness in a range of 5 to 500 nm.

In some embodiments, the nanocomposite has peaks at 500 to 650 $cm^{-1}$, 850 to 1100 $cm^{-1}$ and 2800 to 3300 $cm^{-1}$ in the FT-IR spectrum.

In some embodiments, the nanocomposite has an adsorption capacity for dyes ranging from 1 to 10 milligrams per gram (mg/g) of the nanocomposite at room temperature.

In some embodiments, a weight ratio of the nanocellulose to the nano-bentonite is in a range of 10:1 to 1:5.

In some embodiments, a weight ratio of the dry mixture to the alkylamine is in a range of 1:2 to 1:20.

In some embodiments, the alkylamine is at least one of a monosubstituted alkylamine, a disubstituted alkylamine, and a trisubstituted alkylamine.

In some embodiments, the alkylamine is triethylamine.

In some embodiments, the method further includes preparing the nanocellulose from date-palm tree leaflets using the following steps. The method includes cutting date-palm tree leaflets, washing, and drying. The method further includes grinding the date-palm tree leaflets after drying to form fibers having a reduced particle size, and then treating the fibers with a dilute acid solution and heating thereby removing hemicellulose to form a suspension. The method further includes mixing the suspension with water and an alkaline solution and heating thereby removing lignin and silica form the suspension to form an alkaline mixture containing hydrolyzed cellulose. Furthermore, the method includes filtering the alkaline mixture and cyclic washing until the pH value is 6.5-7.5, to obtain the hydrolyzed cellulose. The method further includes mixing the hydrolyzed cellulose with water and an oxidizing agent at a pH of 3-6 and heating to form a bleached cellulose suspension containing bleached cellulose. Furthermore, the method includes removing the bleached cellulose from the bleached cellulose suspension by filtering, cyclic washing until pH value is 6.5-7.5, and drying to obtain the bleached cellulose. Then, the method includes treating the bleached cellulose with the acid solution and heating to form a crude nanocellulose suspension containing free acid molecules. The method further includes washing the nanocellulose suspension with water to remove the free acid molecules and form a nanocellulose suspension. The method further includes dialyzing the nanocellulose suspension containing nanocellulose against water until the pH value is 6.7-6.9, and then separating the nanocellulose from the nanocellulose suspension, and drying to form the nanocellulose.

In some embodiments, the diluted acid solution is a sulfuric acid solution having a concentration of 10 to 50 wt. % based on a total weight of the sulfuric acid solution.

In some embodiments, the alkaline solution is an alkali-earth metal hydroxide solution. In some embodiments, the alkali-earth metal hydroxide includes potassium hydroxide.

In some embodiments, the oxidizing agent is sodium chlorite ($NaClO_2$).

In some embodiments, the method further includes preparing the nano-bentonite from bentonite clay. The nano-bentonite from bentonite clay is prepared by drying the bentonite clay at 100° C. and ball-milling in the presence of stainless-steel balls to form ball-milled bentonite clay. The bentonite clay is from Jeddah city in Saudi Arabia. The nano-bentonite from bentonite clay is further prepared by mixing the ball-milled bentonite clay in a concentrated acid solution at 70° C. and washing to remove free acid molecules to form a wet bentonite clay mixture. The nano-bentonite from bentonite clay is further prepared by heating the wet bentonite clay mixture at a temperature of at least 500° C. to form the nano-bentonite.

In some embodiments, a weight ratio of the stainless-steel balls to the bentonite clay is in a range of 20:1 to 1:1.

In some embodiments, the concentrated acid solution is a hydrochloric acid solution having a concentration of 20 to 40 wt. % based on a total weight of the hydrochloric acid solution.

In another exemplary embodiment, a water treatment method is described. The water treatment method includes contacting a contaminated aqueous composition containing organic dyes and heavy metals with the nanocomposite to adsorb the organic dyes and heavy metals on the nanocomposite and form a purified aqueous composition.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
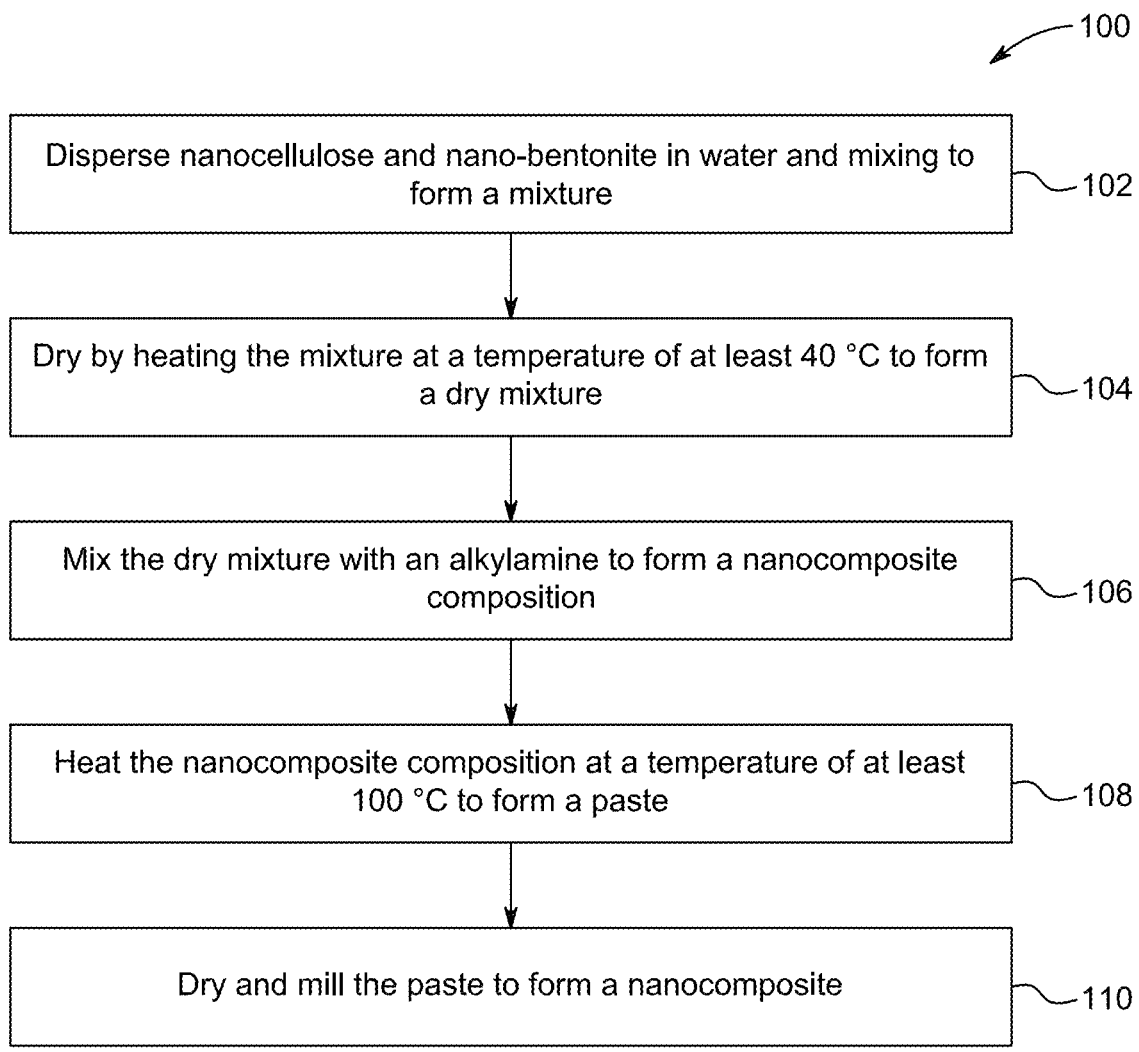
FIG. 1 is a schematic flow chart of a method of making a nanocomposite, according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term 'hemicellulose' refers to one of a number of heteropolymers, such as arabinoxylans, present along with cellulose in almost all terrestrial plant cell walls.

Aspects of the present invention are directed to a method of preparing a nanocomposite of nanocellulose, nano-bentonite, and alkylamine, from bio-based degradable by-products, for water purification. The nanocomposite prepared by the method of the present disclosure uses readily available date palm tree by-products, turning them into valuable material via chemical (acid treatment) and physical processing (sonication). The thermal, morphological, and crystalline properties of the nanocellulose were investigated using scanning electron microscopy (SEM), Fourier transform infrared spectroscopy (FTIR), X-ray diffraction (XRD), zeta potential, and thermogravimetric analysis (TGA). It was found that several parameters of the sonication process, such as sonication time, initial loading of the sample, acoustic power, and sonication temperature, have a significant role to play in the nanocellulose formation. The nanocellulose, prepared by the method of the present disclosure, was found to have a smaller diameter and smoother surface compared to the untreated fibers and had a degradation temperature in a range of about 450 to 650° C. because of the removal of lignin and hemicelluloses. Therefore, cellulose nanocrystals (CNCs) are obtained from low-cost by-products and can be further applied as a biodegradable matrix material.

FIG. 1 illustrates a schematic flow chart of a method 100 of making a nanocomposite. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes dispersing nanocellulose and nano-bentonite in water and mixing to form a mixture. As used herein, the term 'nanocellulose' refers to the nano-structured cellulose or a light solid substance obtained from plant matter and includes nanosized cellulose fibrils. The nanocellulose of the present disclosure is derived from date-palm tree leaflets. Although the description and examples herein provided, refer to the use of *Phoenix dactylifera* L.), to prepare the nanocellulose, it may be understood by a person skilled in the art that leaflets of other date-palm trees such as *Phoenix canariensis, Phoenix roebellenii, Phoenix rupicola, Phoenix reclinate, Phoenix sylvestris, Phoenix theophrastii, Phoenix acaulis*, and *Phoenix loureiri*, or combinations thereof, may be used to prepare the nanocellulose, albeit with a few variations. In some embodiments, the nanocellulose has a width in the range of 5 to 100 nanometers (nm), preferably 10 to 90 nm, preferably 20 to 80 nm, preferably 30 to 70 nm, preferably 40 to 60 nm, or even more preferably about 50 nm. In some embodiments, the nanocellulose is in the form of cellulose nanocrystals and/or cellulose nanofibrils. In some further embodiments, the cellulose nanocrystals have an average particle size in the range of 10 to 500 nm, preferably 50 to 400 nm, preferably 100 to 300 nm, or even more preferably about 200 nm. Other ranges are also possible.

In some embodiments, a weight ratio of the nanocellulose to the nano-bentonite is in a range of 10:1 to 1:5, preferably 8:1 to 1:4, preferably 6:1 to 1:3, preferably 4:1 to 1:2, or more preferably 2:1 to 1:1. Nano-bentonite refers to an absorbent swelling clay, including montmorillonite (a type of smectite) which can either be Na-montmorillonite or Ca-montmorillonite. Na-montmorillonite has a considerably greater swelling capacity than Ca-montmorillonite and is preferred. The nano-bentonite has a particle size range of 5 to 100 nm, more preferably 20 to 80 nm, and yet more preferably 50 to 75 nm. Other ranges are also possible.

Although the nano-bentonite can be obtained from any bentonite clay, the present method uses nano-bentonite prepared from Saudi Arabia bentonite clay. The Saudi bentonite clay is a low-cost inorganic source of valuable materials obtained from the Khulays Mine located in the south of Jeddah, Saudi Arabia. In some embodiments, natural clays from the Khulays Mine consist of a mixture of minerals containing oxides of silica and alumina. In some further embodiments, the preferred bentonite clay is a mineral clay containing at least 30 wt. % of montmorillonite in the clay structure based on a total weight of the bentonite clay, preferably at least 50 wt. %, preferably at least 70 wt. %, preferably at least 80 wt. %, preferably at least 90 wt. %, or even more preferably at least 99 wt. % based on the total weight of the bentonite clay. Additionally, montmorillonite in the bentonite clay may expand due to its structure and may improve the adsorption capacity of the bentonite clay due to its high surface area and interlayer space. In some further preferred embodiments, the bentonite clay may also contain a fraction of other minerals, such as kaolinite and illite. In some embodiments, the fraction of other minerals is no more than 30 wt. % based on a total weight of the bentonite clay, preferably no more than 20 wt. %, preferably no more than 10 wt. %, preferably no more than 5 wt. %, or even more preferably less than 1 wt. % based on the total weight of the bentonite clay. Other ranges are also possible.

In some embodiments, the Saudi bentonite clay may contain at least 70 wt. % of montmorillonite based on a total weight of the Saudi bentonite clay, preferably at least 80 wt. %, preferably at least 90 wt. %, or even more preferably about 99 wt. % based on the total weight of the Saudi bentonite clay, as determined by an X-ray diffraction (XRD) technique. In some further embodiments, the Saudi bentonite clay may also contain no more than 20 wt. % of the kaolinite based on a total weight of the Saudi bentonite clay, preferably no more than 10 wt. %, preferably no more than 5 wt. %, or even more preferably no more than 1 wt. % of the kaolinite based on the total weight of the Saudi bentonite clay, as determined by the XRD technique. The Saudi bentonite clay may further contain a mixture of illite and quartz. In some preferred embodiments, the mixture of illite and quartz is no more than 20 wt. % based on a total weight of the Saudi bentonite clay, preferably no more than 10 wt. %, preferably no more than 5 wt. %, or even more preferably no more than 1 wt. %, based on the total weight of the Saudi bentonite clay, as determined by the XRD technique. Other ranges are also possible.

In some embodiments, the XRD patterns are collected in a Rigaku Miniflex 600 X-ray diffractometer equipped with a Cu-Kα radiation source (λ=1.5406 Å) for a 2θ range extending between 10 and 80°, preferably 20 and 70°, further preferably 30 and 60° at an angular rate of 0.005 to 0.04° s$^{-1}$, preferably 0.01 to 0.03° s$^{-1}$, or even preferably 0.02° s$^{-1}$. In some further embodiments, solid particle density and porosity values are collected in a Accupc 1330 pycnometer by a gas pycnometry method.

In some embodiments, the Saudi bentonite clay has a specific pore volume in a range of 0.01 to 0.2 cubic centimeters per gram (cm$^3$/g), preferably 0.03 to 0.1 cm$^3$/g, preferably 0.05 to 0.09 cm$^3$/g, or even more preferably about 0.07 cm$^3$/g. In some further embodiments, the Saudi bentonite clay has a solid particle density in a range of 2 to 3 grams per cubic centimeters (g/cm$^3$), preferably 2.2 to 2.8 g/cm$^3$, preferably 2.4 to 2.7 g/cm$^3$, or even more preferably about 2.6 g/cm$^3$. Other ranges are also possible.

As used herein, the term "porosity" refers to the fraction of void space within a porous material. In some further preferred embodiments, the Saudi bentonite clay has a porosity of 0.1 to 0.3, based on the fraction of void space in the Saudi bentonite clay, preferably 0.12 to 0.25, preferably 0.14 to 0.2, or even more preferably about 0.17, based on the fraction of void space in the Saudi bentonite clay. Other ranges are also possible.

At step 104, the method 100 includes drying by heating the mixture at a temperature of at least 40° C., preferably at least 60° C., or even more preferably at least 80° C. to form a dry mixture. The drying can be performed in an oven, an autoclave, and a microwave. In a preferred embodiment, the drying is performed in an oven. Other ranges are also possible.

At step 106, the method 100 further includes mixing the dry mixture with an alkylamine to form a nanocomposite composition. In some embodiments, a weight ratio of the dry mixture to the alkylamine is in a range of 1:2 to 1:20, preferably 1:4 to 1:18, preferably 1:6 to 1:16, preferably 1:8 to 1:14, or even more preferably 1:10 to 1:12. As used herein, the term 'alkylamine' refers to the amine (as methylamine) containing one or more alkyl groups. In some embodiments, the alkylamine is at least one of a monosubstituted alkylamine, a disubstituted alkylamine, and a trisubstituted alkylamine. In a preferred embodiment, the alkylamine is triethylamine. In a further preferred embodiment, the triethylamine acts as a crosslinker. In some most preferred embodiments, the alkylamine may be replaced by derivates of the alkylamine, such as chlorpheniramine/dextromethorphan/phenylephrine. In some embodiments, the mixing is performed at a temperature of at least 20° C., preferably at least 40° C., or even more preferably at least 60° C. for 1 to 24 hours, preferably 2 to 20 hours, preferably 4 to 16 hours, preferably 6 to 12 hours, or even more preferably about 8 hours. Other ranges are also possible.

At step 108, the method 100 further includes heating the nanocomposite composition at a temperature of at least 100° C., preferably at least 120° C., preferably at least 140° C., or even more preferably at least 160° C. to form a paste. Other ranges are also possible.

Figure 5:
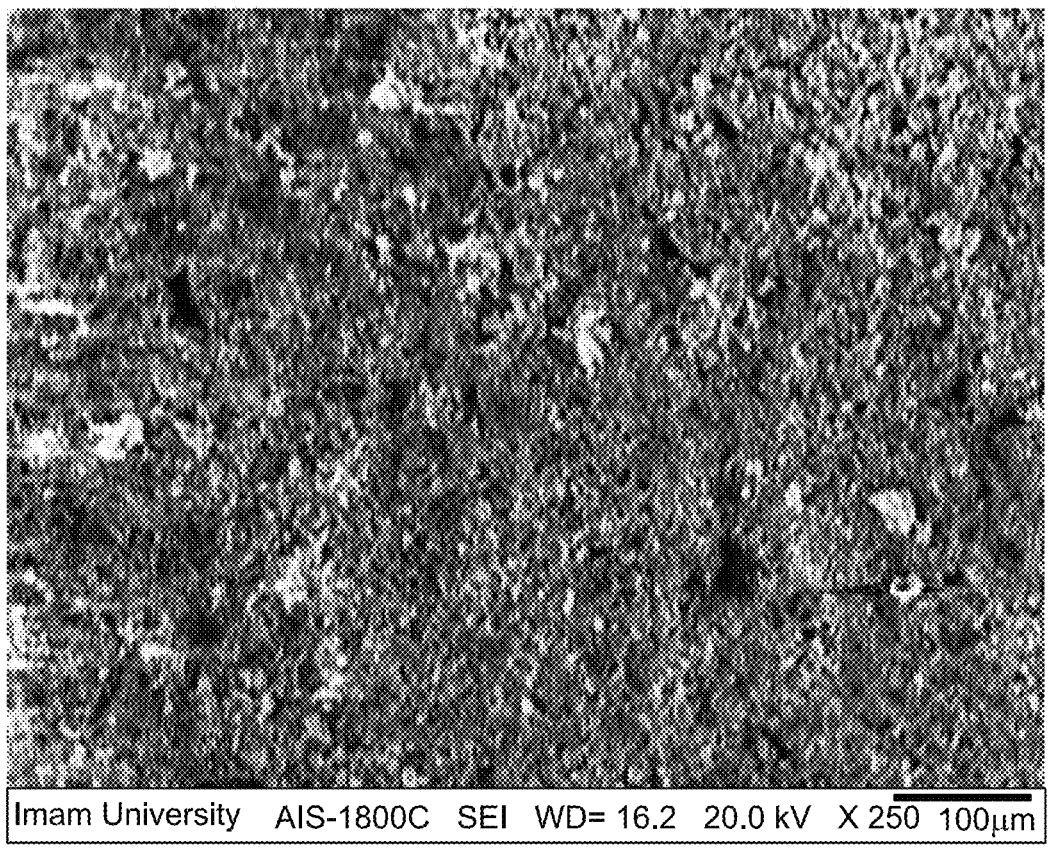
FIG. 5 is a SEM image of the nanocomposite, according to certain embodiments of the present disclosure.

At step 110, the method 100 further includes drying and milling the paste to form the nanocomposite. In some embodiments, the nanocomposite has a thickness in a range of 5 to 500 nm, more preferably 50 to 400 nm, and more preferably 100 to 350 nm. In some further embodiments, morphological analysis reveals that the nanocellulose and nano-bentonite are uniformly distributed throughout the nanocomposite, as depicted in FIG. 5.

Figure 4A:
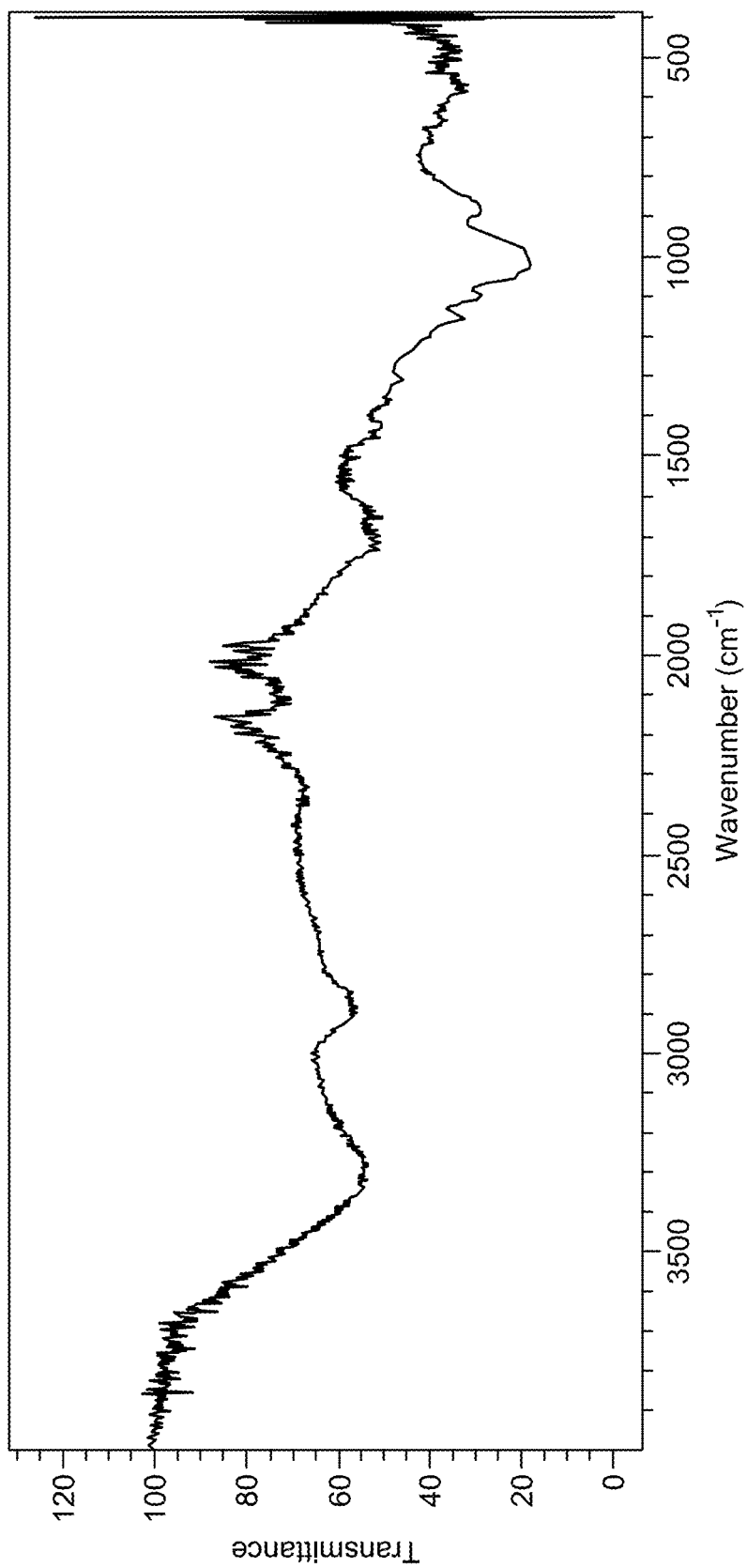
FIG. 4A is an FT-IR spectrum of the nanocellulose, according to certain embodiments of the present disclosure.
Figure 4B:
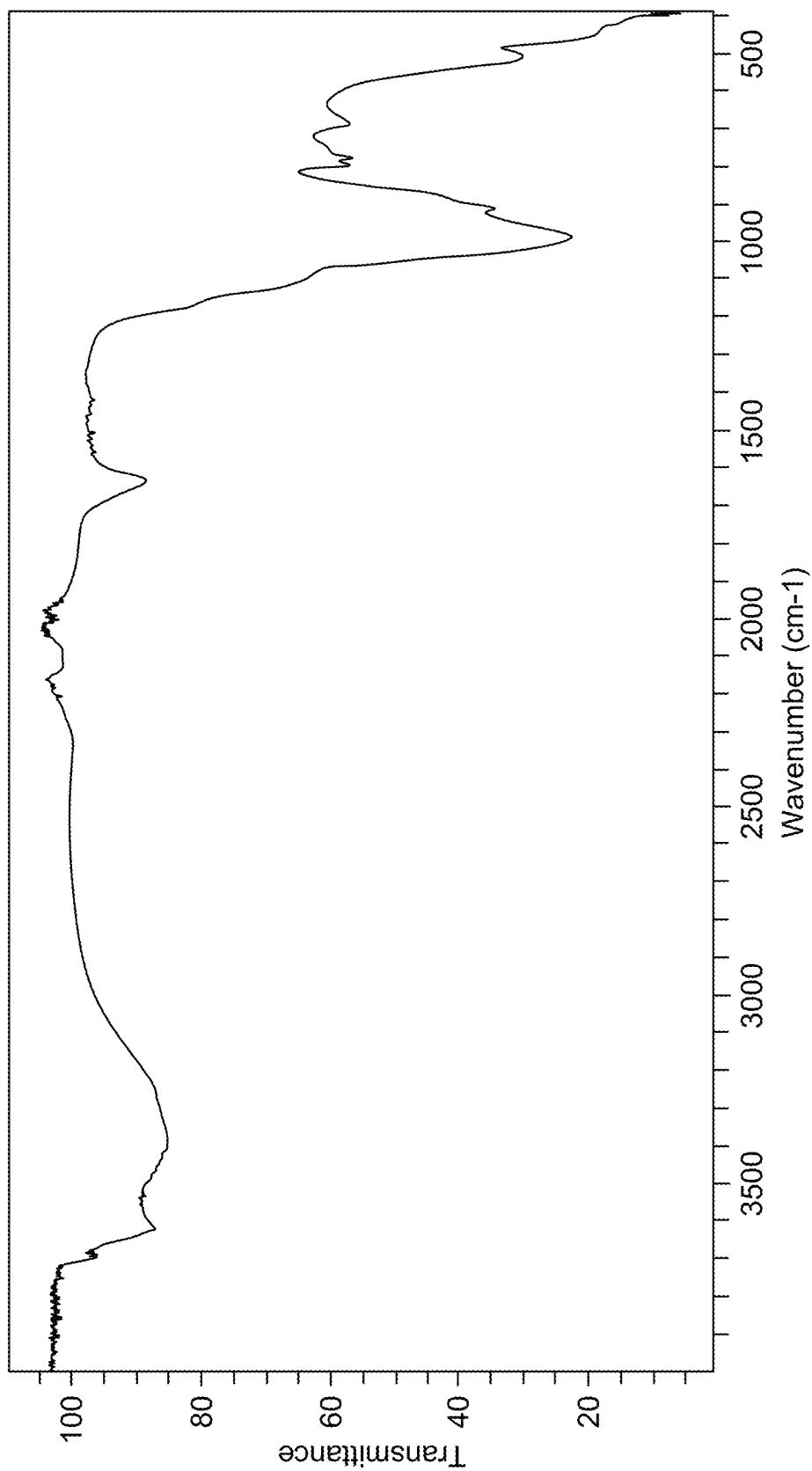
FIG. 4B is a FT-IR spectrum of the nano-bentonite, according to certain embodiments of the present disclosure.
Figure 4C:
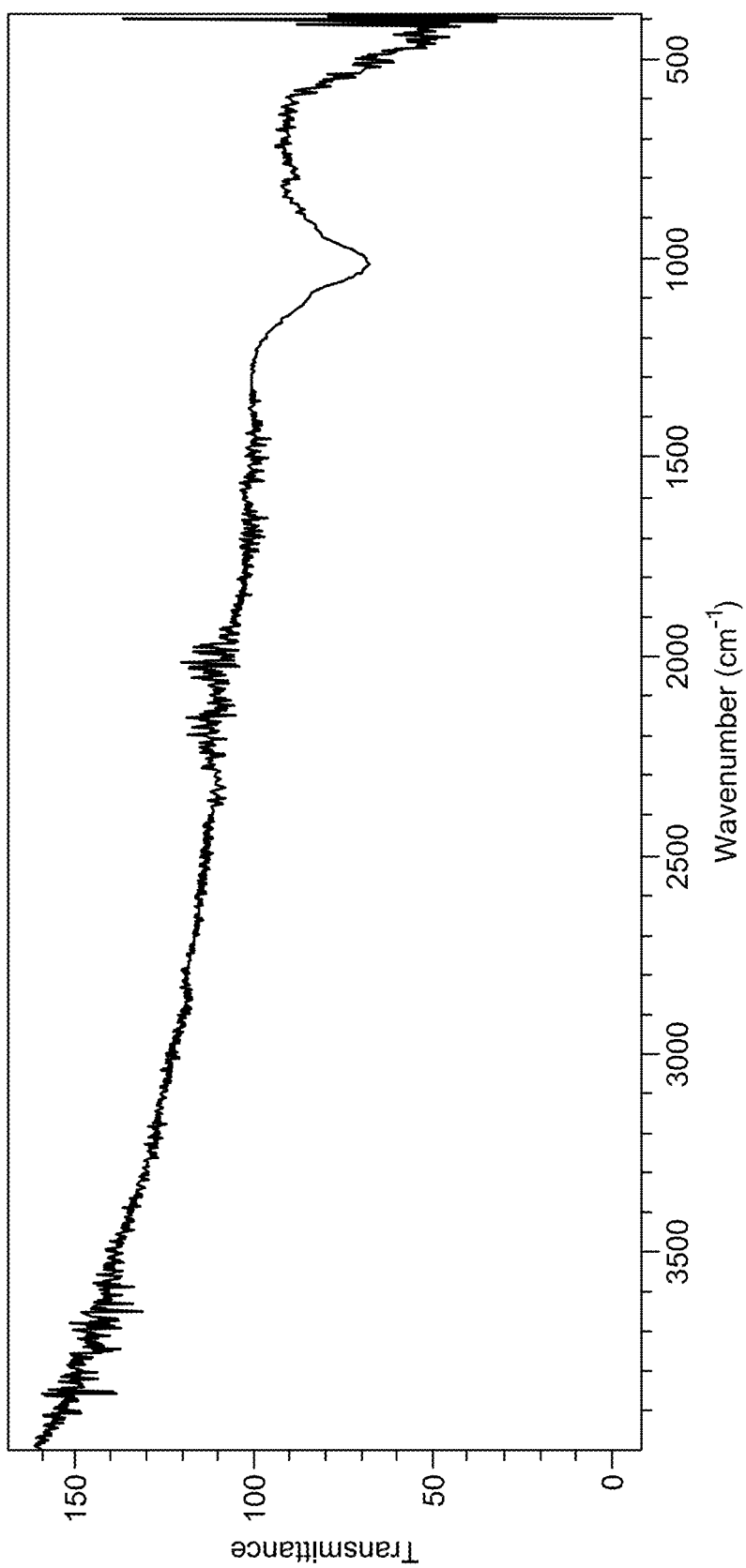
FIG. 4C is a FT-IR spectrum of the nanocomposite, according to certain embodiments of the present disclosure.

The structures of nanocellulose, nano-bentonite, and nanocomposite may be characterized by Fourier-transform infrared spectroscopy (FT-IR), respectively. In some embodiments, the FT-IR are collected in a Nicolet 6700 series acquired in a range of 4500 to 400 centimeter inverse ($cm^{-1}$) at 4 $cm^{-1}$ resolution. At least 5, at least 10, or preferably at least 20 scans were carried out for each sample. In some embodiments, the nanocellulose has peaks at 500 to 650 $cm^{-1}$, 1000 to 1100 $cm^{-1}$ and 2800 to 3400 $cm^{-1}$ in the FT-IR spectrum, confirming its formation as depicted in FIG. 4A. In some embodiments, the nano-bentonite has peaks at 850 to 1050 $cm^{-1}$ and 3400 to 3700 $cm^{-1}$ in the FT-IR spectrum, confirming its formation as depicted in FIG. 4B. In some embodiments, the nanocomposite has peaks at 500 to 650 $cm^{-1}$, 850 to 1100 $cm^{-1}$ and 2800 to 3300 $cm^{-1}$ in the FT-IR spectrum, confirming its formation as depicted in FIG. 4C. Other ranges are also possible.

In some embodiments, the nanocomposite has an adsorption capacity for dyes (such as logwood, walnuts crystals, fustic, brazilwood, and hematine) in a range of 1 to 10 milligrams per gram (mg/g), more preferably 20 to 80 mg/g, and yet more preferably 35 to 65 mg/g, of the nanocomposite at room temperature (RT). As used herein, the term 'adsorption capacity' refers to the amount of an adsorbate taken up by an adsorbent per unit mass (or volume) of the adsorbent.

Figure 2:
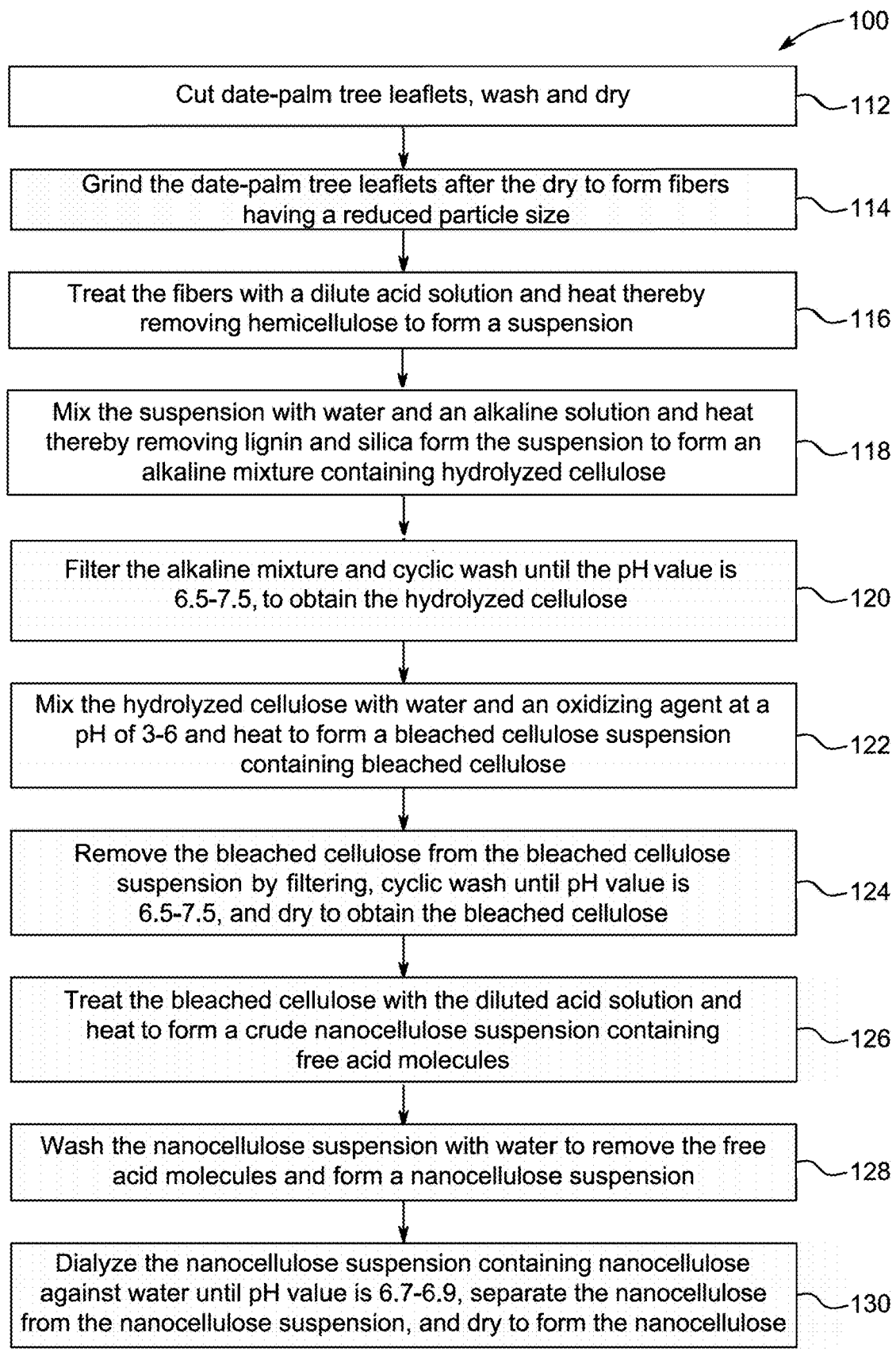
FIG. 2 is a schematic flow chart of the method of preparing nanocellulose from date-palm tree leaflets, according to certain embodiments of the present disclosure.

FIG. 2 illustrates a schematic flow chart of the method 100, which includes preparing the nanocellulose from date-palm tree leaflets by steps 112-130. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 112, the method 100 includes cutting date-palm tree leaflets, washing, and drying. The date-palm tree leaflets can be cut manually or using simple tools such as plucker, scissors, knives, or simple machines known in the art. The date-palm tree leaflets can be cut into small pieces with an approximate size of less than 5 centimeters (cm), preferably less than 3 cm, preferably less than 1 cm, or even more preferably less than 0.5 cm. The date-palm tree leaflets can be washed with ethanol, distilled water, and water. The date-palm tree leaflets can be dried under natural sunlight or in an oven, a microwave, and an autoclave. Other ranges are also possible.

At step 114, the method 100 includes grinding the date-palm tree leaflets after drying to form fibers having a reduced particle size. The date-palm tree leaflets can be ground using mortar and pestle, stainless-steel grinder, or simple machines. The date-palm tree leaflets can be ground into fibers with an approximate size of less than 50 millimeters (mm), preferably less than 30 mm, preferably less than 10 mm, or even more preferably less than 5 mm. Other ranges are also possible.

At step 116, the method 100 includes treating the fibers with a dilute acid solution and heating thereby removing hemicellulose to form a suspension of raw materials. Raw fibers are rich in hemicellulose; however, a high amount of hemicelluloses in the celluloses, obstruct the formation of the nanocomposite. For this purpose, the fibers are treated with acid for removal of the hemicelluloses. The acid solution may include nitric acid, hydrochloric acid, hydrobromic acid, hydroiodic acid, and perchloric acid. In a preferred embodiment, the diluted acid solution is a sulfuric acid solution. In some embodiments, the sulfuric acid solution has a concentration of to 50 wt. %, more preferably 20 to 45 wt. %, and yet more preferably 30 to 40 wt. %, based on a total weight of the sulfuric acid solution. This step causes cellulose dissolution in the enough-concentrated sulfuric acid solutions. Other ranges are also possible.

At step 118, the method 100 includes mixing the suspension with water and an alkaline solution and heating thereby removing lignin and silica form the suspension to form an alkaline mixture containing hydrolyzed cellulose. Removal of lignin and silica makes the hydrolyzed cellulose accessible for further processing. In some embodiments, the alkaline solution may be an alkali-earth metal hydroxide solution. In some further embodiments, the alkaline solution may include lithium hydroxide, sodium hydroxide, and potassium hydroxide. In some preferred embodiments, the alkali-earth metal hydroxide includes potassium hydroxide. In some embodiments, the heating is performed at a temperature of at least 50° C., preferably at least 70° C., preferably at least 90° C., or even more preferably at least 100° C. for at least 1 hour, at least 2 hours, or at least 6 hours. Other ranges are also possible.

At step 120, the method 100 includes filtering the alkaline mixture and cyclic washing until the pH value is 6.5-7.5, to obtain the hydrolyzed cellulose. pH is a significant factor in adsorption processes since pH causes electrostatic changes in solutions. Therefore, the step of washing is critical to remove any traces of the sulfuric acid solution (as used in step 116), or the alkaline solution (as used in step 118), that may affect the pH of the hydrolyzed cellulose suspension.

At step 122, the method 100 includes mixing the hydrolyzed cellulose with water and an oxidizing agent at a pH of 3-6 and heating to form a bleached cellulose suspension containing bleached cellulose. This step is performed to remove lignin and amorphous cellulose. In some embodiments, the oxidizing agent may include halogens (such as chlorine and fluorine), oxygen, and hydrogen peroxide ($H_2O_2$). In a preferred embodiment, the oxidizing agent is sodium chlorite ($NaClO_2$). In a more preferred embodiment, the oxidizing agent is an acidified sodium chlorite ($NaClO_2$). In some embodiments, the oxidizing agent is present in the bleached cellulose suspension at a concentration of 0.5 to 10 g/mL based on a total volume of the water, preferably 1 to 5 g/mL, or even more preferably about 3 g/mL based on the total volume of the water. In some embodiments, the heating is performed at a temperature of at least 50° C., preferably at least 70° C., preferably at least 90° C., or even more preferably at least 100° C. for at least 1 hour, at least 2 hours, or at least 6 hours. Other ranges are also possible.

At step 124, the method 100 includes removing the bleached cellulose from the bleached cellulose suspension, cyclic washing until pH value is 6.5-7.5, and drying to obtain the bleached cellulose.

At step 126, the method 100 includes treating the bleached cellulose with the diluted acid solution and heating to form a crude nanocellulose suspension containing free acid molecules. In some embodiments, the treating is performed in sulfuric acid having a concentration of at least 20 wt. %, at least 40 wt. %, or at least 60 wt. % at a temperature of at least 25° C., preferably at least 45° C., or even more preferably at least 65° C., for at least 15 minutes, at least 30 minutes, or at least 60 minutes. Other ranges are also possible.

At step 128, the method 100 includes washing the nanocellulose suspension with water to remove the free acid molecules and form a nanocellulose suspension. The nanocellulose suspension was further dried in an oven at a temperature of at least 80° C. to remove the water molecules. Other ranges are also possible.

At step 130, the method 100 further includes dialyzing the nanocellulose suspension containing nanocellulose against the water until the pH value is 6.7-6.9. The dialysis can be performed in dialysis tubes, preferably with 6-8 kilodaltons (kDa). In some embodiments, the suspension may be sonicated for 5 to 60 minutes, preferably 10 to 50 minutes, preferably 20 to 40 minutes, or even more preferably about 30 minutes. In some further embodiments, temperature of the nanocellulose suspension is in a range of 0 to 40 degrees centigrade (° C.) during the sonication process, preferably 5 to 30° C., preferably 10 to 20° C., or even more preferably about 15° C. Further, the method includes separating the nanocellulose from the nanocellulose suspension and drying it to form the nanocellulose. In some further embodiments, the sonication is performed under an acoustic power of from 1 to 100 kilohertz (kHz), preferably 3 to 80 kHz, preferably 5 to 60 kHz, preferably 7 to 40 kHz, preferably 9 to 20 kHz, or even more preferably about 20 kHz. In some embodiments, the separation can be performed by centrifugation, filtration, or any simple technique known in the art. In a preferred embodiment, the separation is carried out via a centrifugation process at 5,000 to 20,000 revolutions per minute (rpm), or preferably 10,000 rpm for at least 5 minutes, at least 10 minutes, or more preferably at least 30 minutes. The precipitate is then dried in an oven at a temperature of at least 40° C., preferably at least 60° C. for 1 to 6 hours, or preferably about 2 hours, and in the open air for one day, to prepare the nanocellulose. Other ranges are also possible.

Figure 3A:
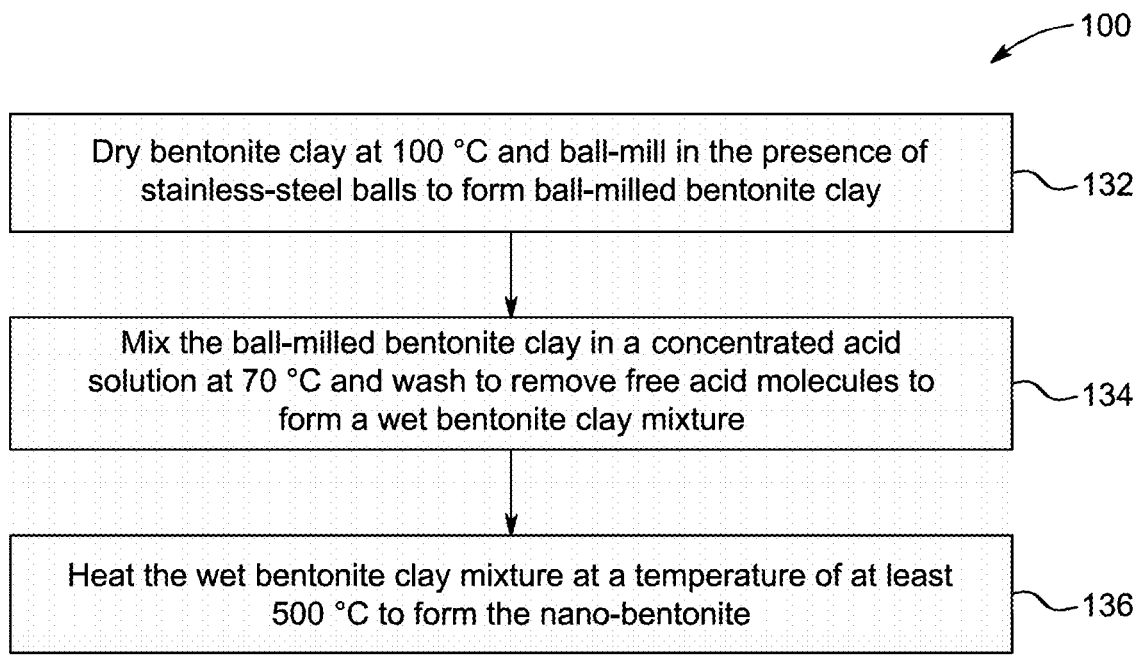
FIG. 3A is a schematic flow chart of the method of preparing nano-bentonite from bentonite clay, according to certain embodiments of the present disclosure.

FIG. 3A illustrates a schematic flow chart of the method 100 which includes preparing the nano-bentonite from the bentonite clay by steps 132-136. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 132, the method 100 includes drying the bentonite clay at 100° C. and ball-milling in the presence of stainless-steel balls to form ball-milled bentonite clay. The main advantage of ball-milling is to grind powders into fine particles and blend materials. In some embodiments, the bentonite clay is dried in an oven at a temperature of at least 80° C., preferably about 100° C. to remove the water molecules for at least 2 hours, preferably at least 6 hours, preferably at least 12 hours, or even more preferably about 24 hours. In some embodiments, the bentonite clay is from Jeddah city in Saudi Arabia. In some further embodiments, a weight ratio of the stainless-steel balls to the bentonite clay is in the range of 20:1 to 1:1, preferably 15:1 to 2:1, preferably 10:1 to 4:1, or even more preferably about 5:1. Other ranges are also possible.

At step 134, the method 100 includes mixing the ball-milled bentonite clay in a concentrated acid solution at a temperature in a range of 40 to 100°, preferably about 70° C., for at least 30 minutes, preferably about 60 minutes, and washing to remove free acid molecules to form a wet bentonite clay mixture. In some embodiments, the acid solution may be HCl, $H_2SO_4$, or a mild acid like acetic acid. In a preferred embodiment, the concentrated acid solution is a hydrochloric acid solution having a concentration of 20 to 40 wt. % based on the total weight of the hydrochloric acid solution, preferably about 30 wt. % based on the total weight of the hydrochloric acid solution. Other ranges are also possible.

At step 136, the method 100 includes heating the wet bentonite clay mixture at a temperature of at least 500° C., preferably at least 550° C., or even more preferably at least 600° C. to form the nano-bentonite. The purpose of heating is to remove all the water molecules, or any impurities, in the nano-bentonite. The nano-bentonite thus obtained can be in the form of a powder. Other ranges are also possible.

In an aspect of the present disclosure, a water treatment method, particularly for treating wastewater, is described. As used herein, the term 'wastewaters' refers to a broad category of substances considered wastes by society, including sewage, stormwater, leachate, and septic tank wastewater. The present disclosure may relate to a water treatment method for treating an aqueous system, i.e., a water source or stream. In some embodiments, a water treatment method for reducing solubilized water hardness using various water treatment agents bound to a supporting material can also be provided. In some examples, the nanocomposite is attached to or immobilized on a membrane for use as adsorption filter membrane. In some examples, the nanocomposite is dispersed in a membrane matrix, preferably polymeric, for use as adsorption filter membrane. In some examples, the nanocomposite is attached to or immobilized on inert beads and packed in a column for use as an adsorbent column.

Furthermore, a water treatment method for inhibiting or reducing scale formation may also be provided. The present disclosure may also relate to methods of employing treated water, for example, in cleaning processes. In a preferred embodiment, the water treatment method includes contacting a contaminated aqueous composition containing organic dyes and heavy metals with the nanocomposite to adsorb the organic dyes (such as logwood, walnuts crystals, fustic, brazilwood, and hematine) and heavy metals (such as antimony, arsenic, bismuth, cadmium, cerium, chromium, cobalt, copper, gallium, gold, iron, lead, manganese, mercury, nickel, platinum, silver, tellurium, thallium, tin, uranium, and vanadium) on the nanocomposite and form a purified aqueous composition. In some examples, the dye is a cationic textile dye, methyl violet dye, fuchsine dye, phenol dye, malachite green dye, Victoria blue dye, or xanthene dye. In a further preferred embodiment, the water treatment method includes contacting a contaminated aqueous composition containing organic dyes and heavy metals with at least one material of the nanocellulose and the nano-bentonite to adsorb the organic dyes and heavy metals on the at least one material of the nanocellulose and the nano-bentonite and form a purified aqueous composition.

In some embodiments, the contacting is performed for 50 to 300 minutes, preferably 60 to 250 minutes, preferably 70 to 200 minutes at 20 to 100° C., preferably 30 to 90° C., preferably 30 to 80° C., preferably 30 to 70° C., preferably 30 to 60° C. In some embodiments, the nanocomposite may be present in the contaminated aqueous composition at a concentration of 0.01 to 10,000 mg/L, preferably 1 to 5,000 mg/L, preferably 100 to 1,000 mg/L, preferably 200 to 800 mg/L, or even more preferably about 500 mg/L. Other ranges are also possible.

In some further embodiments, the nanocomposite of the present disclosure can remove 70 to 99.9%, preferably 75 to 99.9%, preferably 80 to 99.9% of the organic dyes and heavy metals from the contaminated aqueous composition. Other ranges are also possible.

The examples below are intended to further illustrate protocols for preparing, characterizing, and using the nanocomposite and for performing the method described above and are not intended to limit the scope of the claims.

Where a numerical limit or range is stated herein, the endpoints are included. Also, all values and subranges within a numerical limit or range are specifically included as if explicitly written out.

EXAMPLES

The following examples describe and demonstrate exemplary embodiments of method 100 of making a nanocomposite described herein. The examples are provided solely for the purpose of illustration. They are not to be construed as limitations of the present disclosure, as many variations thereof are possible without departing from the spirit and scope of the present disclosure.

Example 1: Materials

Raw materials (leaflets) were collected from a local farm in Riyadh province, Saudi Arabia. Sodium hydroxide (NaOH), potassium hydroxide (KOH), sulfuric acid ($H_2SO_4$), acetic acid ($CH_3COOH$), and sodium chlorite ($NaClO_2$) were high-grade laboratory chemicals purchased from BDH chemicals.

Example 2: Extraction of Cellulose

The leaves of date palm were mechanically cut to small sizes (ca. 0.5-1 centimeters (cm)), washed with distilled water three times to remove dust and impurities, and then well dried in a sunny area for 12 hours. After complete drying, a stainless-steel grinder was used to mill the leaflets into fibers with an approximate size of fewer than five millimeters (mm). 150 grams (g) of ground leaflets were placed into a round-bottom flask, to which was added one liter of distilled water. 40 g of sulfuric acid was added gradually under heating, for 2 hours, at a fixed temperature (90° C.) to remove hemicelluloses. The residue was filtrated and washed with de-ionized water several times to a neutral pH.

Example 3: Hydrolysis Process Using KOH

A hydrolysis process was carried out using 1000 g of distilled water and 50 g of potassium hydroxide (KOH) at 90° C. for 2 hours to remove lignin and silica, leaving behind a residue. The residue was further filtered and washed with de-ionized water to ensure the purification of the residue and obtain a neutral pH.

Example 4: Bleaching Process

A bleaching process was carried out involving the treatment of cellulose with an aqueous solution of $NaClO_2$ (30 g/1000 g water) to remove lignin and amorphous cellulose. The pH was adjusted to 4.5 using acetic acid, and the solution was stirred for 4 hours at a fixed temperature (75° C.). The final product was filtered and neutralized with deionized water several times. The residue was then dried in an oven at 80° C. until a constant weight was reached.

Example 5: Preparation of Nanocellulose

Sulfuric acid 60 wt. %, was used to prepare the nanocellulose at 45° C. for 45 min. After the reaction, the sample (nanocellulose) was washed seven times with cold deionized water to remove the sulfuric acid residue. The washing was performed by centrifugation at 5,000 rotations per minute (rpm) for 20 minutes. The suspension was then transferred to dialysis tubes (6-8 kDa) MWCO against deionized water and equilibrated for 48 hours until a neutral residue was reached (pH=6.7-6.9). The sonication process (20 kilohertz (kHz), 10 minutes, at 10° C.) was carried out to scatter the nanocellulose. The ratio of the suspension to water was 20:1. The resulting nanocellulose was filtered by centrifugation at 10,000 rpm for 10 minutes. The precipitate, i.e., nanocellulose, was collected and dried in an oven at 60° C. for 2 hours in the open air for one day to prepare the nanocellulose for characterization.

In other words, the cellulose was extracted from dried fronds (leaflets) of the date-palm tree using alkali treatment [R. Weishaupt, G. Siqueira, M. Schubert, M. M. Kampf, T. Zimmermann et al., Adv. Funct. Mater., 27, 4 (2017), incorporated herein by reference in its entirety]. Then, the cellulose was converted to nanocellulose using acidic hydrolysis of 43% sulfuric acid, under continuous stirring, at 80° C. After heating, a suspension of nanocellulose was observed. The reaction was then quenched by adding 250 mL of distilled water. The product settled down properly, and the upper portion was decanted to remove the excess acid. The decantation was performed 2-3 times until the fibers started suspending in water. After that, the fibers were centrifuged at 3000 rpm for 10 min till the pH of the upper suspension reached above 2.5. Then, the nanofibers were transferred to a dialysis bag (6-8 kDa) for further purification for 4-5 days until the conductivity of water reached below 5 micro siemens ($\mu S$). After dialysis, the slurry was again centrifuged at 3000 rpm for 5 min to separate micro and nanofibers.

Example 6: Preparation of Nano-Bentonite

A bentonite sample was collected from Jeddah city in Saudi Arabia. The bentonite sample was ground into a fine powder and dried at 100° C. for 12 hours. Then, 10 g of the powdered bentonite sample was placed into a stainless-steel vial, and stainless-steel balls in the ratio of (1 bentonite:5 balls) were added. The stainless-steel vial was placed in bench-top planetary ball mills (PULVERISETTE 7) for the ball milling process (24 hours at 15 rpm). Hydrochloric acid 32% was used for stirring (300 rpm) the ball-milled bentonite at 70° C. for 1 hour. The sample was washed with de-ionized water several times until normal pH. Then, the sample was heated in a furnace at 600° C. to remove chlorides. Then the sample was stored in a desiccator for further processing.

Example 7: Preparation of Nanocomposite

Figure 3B:
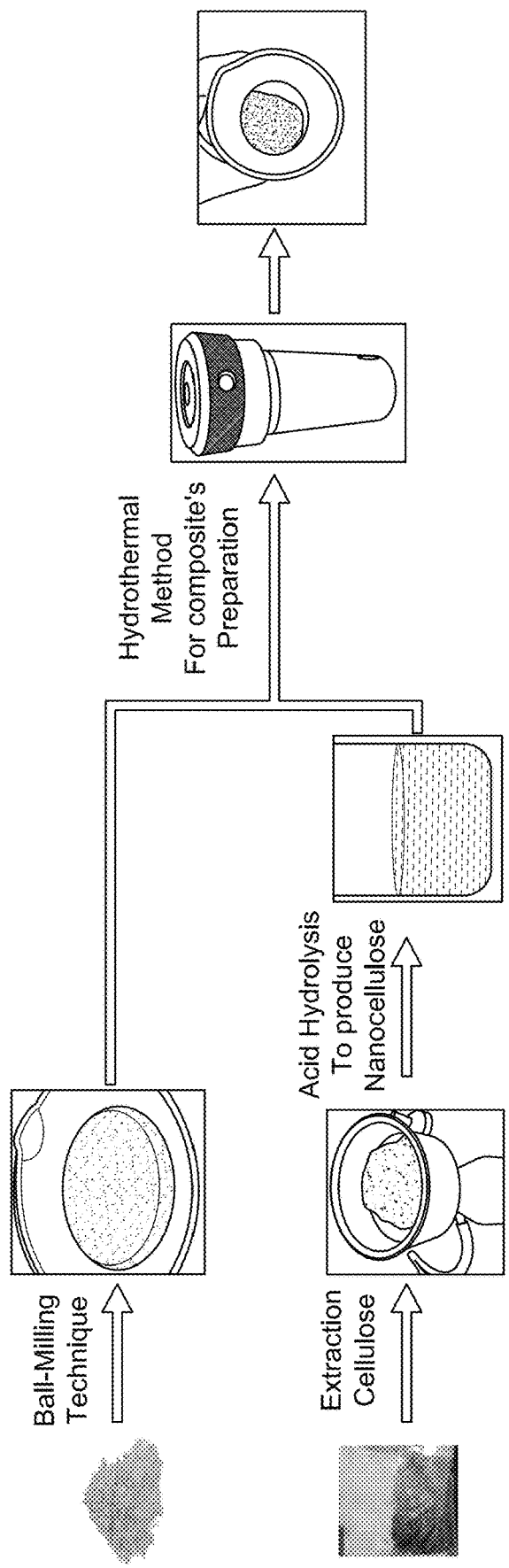
FIG. 3B is an exemplary diagram of preparing the nanocomposite, according to certain embodiments of the present disclosure.

For this purpose, 1 g of nanocellulose was mixed with 0.5 nano-bentonite in distilled water to form a mixture. The mixture was stirred for 12 hours for homogenization. Then the mixture was dried in an oven at 80° C. for 4 hours. Further, 20 mL of triethylamine was added to the dried mixture of nano-bentonite and nano-cellulose. Then, the same was stirred (5000 rpm) for 8 hours at 40° C. The mixture was then transferred to a Teflon autoclave for heating at 150° C. for 24 hours. After heating, the autoclave cylinder was removed from the oven for cooling. Then, the paste was collected and dried. FIG. 3B shows an exemplary diagram of the preparation of the nanocomposite.

Example 8: Adsorption Mechanism

The prepared nanocomposite was evaluated for its ability to remove organic dyes from wastewater solution by adsorption. The nanocomposite potentials for removing dyes from wastewater have been studied. Some parameters (e.g., equilibrium time, pH, maximum capacity of the adsorption, temperature effect, zeta potential, etc.) that affect the adsorption were investigated. The results of the temperature adsorption isotherm have shown that increasing the adsorption temperature increases the adsorption capacity. Therefore, the adsorption process is endothermic. The maximum capacity of the nanocellulose in the dye adsorption was 4 mg/g at room temperature. pH is a significant factor in adsorption processes since pH causes electrostatic changes in solutions. A zeta potential study of the nanocomposite showed that dye adsorption on nanocellulose is influenced by the pH of the solution.

Example 9: Fourier Transform Infrared Spectrometer (FT-IR) Characterization

A Nicolet 6700 FTIR was used to record the FT-IR spectra in the transmission mode, between 4500 and 400 cm$^{-1}$. The raw material, the extracted cellulose, and the obtained nanocellulose were each scanned with a resolution of 4 cm$^{-1}$.

Example 10: X-Ray Diffraction (XRD) Analysis Characterization

XRD analysis of the raw material, the cellulose, and the nanocellulose was carried out. The measurements were performed on a D8 Brucker diffractometer, with Cu-K radiation ($\lambda$=1.54178 angstrom (Å)) in the range 2θ-10-70° with 0.02° step size. SEM images of the raw material, the extracted cellulose, and the nanocellulose were recorded by a JSM-IT 500 HR (JEOL, Japan) at 10 (kV) accelerating voltage. The samples (the raw material, the extracted cellulose, and the nanocellulose) were placed on a metal holder and coated with gold. The coating process lasted for 45 minutes to ensure efficient conductivity before analysis.

Example 11: Thermogravimetric Analysis (TGA) Characterization

The thermal stability of the raw material, the cellulose, and the resulting nanocellulose (samples) were studied by a Perkin Elmer STA-6000 instrument. TGA curves of the samples were recorded at a heating rate of 10° C. per minute in the range from 30° C. to 1100° C. under a continuous nitrogen flow of 20.0 milliliter per minute (mL/min).

Example 12: Nanocellulose Characterization

Lignin content (%) of the raw material before and after the purification and bleaching processes is a significant parameter in the preparation of nanocellulose. Lignin is insoluble in sulfuric acid and can obstruct the formation of nanocellulose. Fibers of royal palm date leaves have a lignin content of 10.4±0.9%, [L. Chen, J. Y. Zhu, C. Baez, P. Kitin and T. Elder, Green Chem., 18, 3835 (2016), which is incorporated herein by reference in its entirety]. Therefore, bleaching is carried out to substantially decrease the purified material's lignin content. The nanocellulose obtained by the method of the present disclosure remains suspended when mixed with water, without dissolving. Such behavior can be attributed to the negative charge on the surface of the particles of the nanocellulose. When the solution was dried, very light and tiny crystals were obtained. In a 20:1 mixture ratio with water, the suspension became gel-like. On reducing the water content, the suspended particles got closer together and aligned spontaneously as an auto-assembly.

Example 13: FT-IR Analysis

The FT-IR spectra of all the samples (the raw material, the extracted cellulose, and the nanocellulose) show a similar trend of absorption bands. In the region between 3630 and 3105 cm-1, a broad band is attributed to O—H stretching vibrations, confirming the presence of the cellulose molecule. The fibers show a peak at the wavelength of 1600-1650 cm$^{-1}$ (which can be attributed to their hydrophilic nature), corresponding to the bending vibration of absorbed water. Peaks at 1200, 1360, and 1630 cm$^{-1}$ indicate the presence of lignin in the raw material, corresponding to the carbonyl group in aromatic skeletal vibration. After alkali treatment and bleaching, the peaks appear with low intensity. A small band at 900 cm$^{-1}$ may be attributed to the glycoside bond (β-1 and β-4) in amorphous cellulose in the raw material. Strong peaks were observed around 1040 cm-1, which became stronger after alkali hydrolysis (about 1039-1070 cm$^{-1}$). FIGS. 4A-4C show FT-IR spectra of the nano-bentonite, nanocellulose, and nanocomposite, respectively.

Example 14: XRD Analysis

The XRD data allows studying a sample crystallinity due to the diffraction peaks from the cellulose crystals corresponding to the raw material, the extracted cellulose, and the nanocellulose. Peaks at 2θ=22.3° and 16.3° indicate the crystal structure of cellulose. The XRD pattern of the raw material reveals the presence of a lot of amorphous regions, due to the presence of hemicelluloses and lignin in the untreated sample. The peak at 2θ=22.3° is attributed to the cellulose, and the peak at 16.3° is due to the amorphous region corresponding to the crystallographic plane (101) [M. S. Nazir, B. A. Wahjoedi, A. W. Yussof and M. A. Abdullah, Bioresources, 8, 2161 (2013); Y. Mazlita, H. V. Lee and S. B. A. Hamid, Polym. Polym. Compos., 24, 719 (2016), incorporated herein by reference in their entirety]. There is crystallographic interference in the XRD pattern of the raw material, as the raw material was subjected to no pretreatment other than grinding. The crystallinity index was estimated using the method for cellulose-Segal's method:

$$I_{cry} = \frac{I_{max} - I_{min}}{I_{max}} \times 100,$$

where $I_{max}$ is the maximum intensity (2θ=22.3°) of both crystalline and amorphous phase and $I_{min}$ is the peak intensity (2θ=16.3°) of the amorphous fraction.

The crystallinity index ($I_{cry}$) indicates the degree of crystallinity, and the crystallinity index ($I_{cry}$) was used to compare the order of crystallinity for each of the materials under study. The crystallinity index ($I_{cry}$) of the samples was calculated, and the results indicate that the crystallinity index ($I_{cry}$) showed a remarkable increase as the raw material was subjected to the treatments. The peak intensity increased in the following order: raw material<extracted cellulose<nanocellulose, indicating that the nanocellulose exhibited the highest crystallinity. Consequently, the non-cellulosic content was removed, the amorphous region was degraded, and a more ordered crystalline structure was obtained.

Example 15: SEM Characterization

SEM images of the raw material, the extracted cellulose, and the nanocellulose were taken at magnifications ranging from 500× to 10000× to determine the distribution of particles diameter. According to the SEM images, the untreated raw material has multi-cellular structures due to lignin and hemicelluloses. The extracted cellulose has white color surrounding the cellular structures, possibly due to removing at least a part of hemicelluloses by treatment. Also, the surface of the leaflets becomes rough due to the removal of lignin, hemicelluloses, and other substances, such as waxes, fats, oils, etc. The fiber length of the untreated sample is longer than 100 μm and approximately 20 μm wide. After bleaching and lignin removal, cellulose nanocrystals (CNCs) has reduced particle sizes of ≤50 nm as a result of acidic hydrolysis and sonication. The average diameter of the CNCs is lower than the average value of cellulose nanofibers. FIG. 5 shows SEM image of the nanocomposite.

Example 16: Thermogravimetric Analysis

TG curves for the samples (the raw material, the extracted cellulose, and the obtained nanocellulose) are obtained on a Perkin Elmer STA-6000 instrument. The mass reduction of all the samples starts at the expected temperature based on moisture release. The highest degree of degradation occurs at a temperature range from 300 to 400° C., consistent with the fact that the material has been obtained from palm tree biomass (degree of deterioration of cellulose and lignin-rich materials). However, the chemical treatment removes the amorphous tissues, resulting in higher crystallinity and higher resistance to thermal degradation. The TG analysis also indicate that all the tested samples show slow deformation starting from about 400° C. (around 380° C.) because α-cellulose has completely decomposed at a temperature lower than 380° C. The treatment increased the thermal stability of the material, indicating an increased heat resistance to the material.

The present disclosure provides the low-cost and eco-friendly nanocomposite obtained from agricultural residues, such as palm date leaves (cellulose-rich resource). Cellulosic materials and CNCs have been obtained through repeated chemical treatments from the date palm leaflets available as a by-product. The lignin and hemicelluloses were efficiently removed under alkaline conditions (KOH, 0.893 M). Acid hydrolysis with 60% (w/v) $H_2SO_4$, followed by a sonication process (20 kHz, 10 min, at 100° C.), was the procedure that led to nanocellulose formation. The analyses revealed the formation of nanocellulose with a uniform appearance and a high degree of crystallinity. Furthermore, the fabrication of the nanocomposite devoid use of multiple chemicals. The nanocomposite includes high strength, hydrophilic and high surface area, which can absorb pollutants from water samples.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of making a nanocomposite, comprising:
dispersing nanocellulose and nano-bentonite in water and mixing to form a mixture;
drying by heating the mixture at a temperature of at least 40° C. to form a dry mixture;
mixing the dry mixture with an alkylamine to form a nanocomposite composition;
heating the nanocomposite composition at a temperature of at least 100° C. to form a paste; and
drying and milling the paste to form the nanocomposite;
wherein the nanocellulose is prepared from date-palm tree leaflets; and
wherein the nano-bentonite is prepared from Saudi Arabia bentonite clay from the Khulays Mine.

2. The method of claim 1, wherein the nanocellulose has a width in a range of 5 to 100 nanometers (nm).

3. The method of claim 1, wherein the nanocellulose has peaks at 500 to 650 centimeter inverse ($cm^{-1}$), 1000 to 1100 $cm^{-1}$ and 2800 to 3400 $cm^{-1}$ in a Fourier transform infrared (FT-IR) spectrum.

4. The method of claim 1, wherein the nano-bentonite has a particle size in a range of 5 to 100 nm.

5. The method of claim 1, wherein the nano-bentonite has peaks at 850 to 1050 $cm^{-1}$ and 3400 to 3700 $cm^{-1}$ in the FT-IR spectrum.

6. The method of claim 1, wherein the nanocellulose and nano-bentonite are uniformly distributed throughout the nanocomposite, and wherein the nanocomposite has a thickness in a range of 5 to 500 nm.

7. The method of claim 1, wherein the nanocomposite has peaks at 500 to 650 $cm^{-1}$, 850 to 1100 $cm^{-1}$ and 2800 to 3300 $cm^{-1}$ in the FT-IR spectrum.

8. The method of claim 1, wherein the nanocomposite has an adsorption capacity for dyes in a range of 1 to 10 milligrams per gram (mg/g) of the nanocomposite at room temperature.

9. The method of claim 1, wherein a weight ratio of the nanocellulose to the nano-bentonite is in a range of 10:1 to 1:5.

10. The method of claim 1, wherein a weight ratio of the dry mixture to the alkylamine is in a range of 1:2 to 1:20.

11. The method of claim 1, wherein the alkylamine is at least one of a monosubstituted alkylamine, a disubstituted alkylamine, and a trisubstituted alkylamine.

12. The method of claim 1, wherein the alkylamine is triethylamine.

13. The method of claim 1, further comprising:
preparing the nanocellulose from date-palm tree leaflets by:
cutting date-palm tree leaflets, washing and drying;
grinding the date-palm tree leaflets after the drying to form fibers having a reduced particle size;
treating the fibers with a dilute acid solution and heating thereby removing hemicellulose to form a suspension;
mixing the suspension with water and an alkaline solution and heating thereby removing lignin and silica form the suspension to form an alkaline mixture containing hydrolyzed cellulose;
filtering the alkaline mixture and cyclic washing until the pH value is 6.5-7.5, to obtain the hydrolyzed cellulose;
mixing the hydrolyzed cellulose with water and an oxidizing agent at a pH of 3-6 and heating to form a bleached cellulose suspension containing bleached cellulose;
removing the bleached cellulose from the bleached cellulose suspension by filtering, cyclic washing until pH value is 6.5-7.5, and drying to obtain the bleached cellulose;
treating the bleached cellulose with the diluted acid solution and heating to form a crude nanocellulose suspension containing free acid molecules;
washing the nanocellulose suspension with water to remove the free acid molecules and form a nanocellulose suspension;
dialyzing the nanocellulose suspension containing nanocellulose against water until pH value is 6.7-6.9, separating the nanocellulose from the nanocellulose suspension, and drying to form the nanocellulose.

14. The method of claim 13, wherein the diluted acid solution is a sulfuric acid solution having a concentration of 10 to 50 wt. % based on a total weight of the sulfuric acid solution.

15. The method of claim 13, wherein the alkaline solution is an alkali-earth metal hydroxide solution, and wherein the alkali-earth metal hydroxide comprises potassium hydroxide.

16. The method of claim 13, wherein the oxidizing agent is sodium chlorite ($NaClO_2$).

17. The method of claim 1, further comprising:
preparing the nano-bentonite from bentonite clay by:
drying the bentonite clay at 100° C. and ball-milling in the presence of stainless-steel balls to form ball-milled bentonite clay;
wherein the bentonite clay is from the Khulays Mine in Saudi Arabia;
mixing the ball-milled bentonite clay in a concentrated acid solution at 70° C. and washing to remove free acid molecules to form a wet bentonite clay mixture; and
heating the wet bentonite clay mixture at a temperature of at least 500° C. to form the nano-bentonite.

18. The method of claim 17, wherein a weight ratio of the stainless-steel balls to the bentonite clay is in a range of 20:1 to 1:1.

19. 19: The method of claim 18, wherein the concentrated acid solution is a hydrochloric acid solution having a concentration of 20 to 40 wt. % based on a total weight of the hydrochloric acid solution.

20. A water treatment method, comprising:
contacting a contaminated aqueous composition containing organic dyes and heavy metals with the nanocomposite of claim 1 to adsorb the organic dyes and heavy metals on the nanocomposite and form a purified aqueous composition.

* * * * *